United States Patent [19]

Fasano et al.

[11] Patent Number: 4,534,216

[45] Date of Patent: Aug. 13, 1985

[54] METHOD AND APPARATUS FOR DETERMINING THE ACCURACY OF WIND TUNNEL TEST DATA

[75] Inventors: Anthony Fasano, Glastonbury; John H. Roberts, Bolton; David L. Motycka, Glastonbury, all of Conn.

[73] Assignee: United Technologies Corporation, Hartford, Conn.

[21] Appl. No.: 499,700

[22] Filed: May 31, 1983

[51] Int. Cl.³ .......................... G01M 9/00; G01L 5/13
[52] U.S. Cl. .................................. 73/147; 73/432 SD; 73/117.4
[58] Field of Search ................ 73/147, 432 SD, 117.1, 73/117.4, 112, 1 R, 1 B, 1 D

[56] References Cited

U.S. PATENT DOCUMENTS

| | | | |
|---|---|---|---|
| 3,392,577 | 7/1968 | Barr, Jr. et al. | 73/147 |
| 3,434,679 | 3/1969 | Kutney et al. | 244/53 |
| 3,465,579 | 9/1969 | Cason | 73/117.4 |
| 3,478,583 | 11/1969 | Barr, Jr. et al. | 73/147 |
| 3,960,000 | 6/1976 | Barnett et al. | 73/15.4 |
| 4,034,604 | 7/1977 | Decher et al. | 73/147 |
| 4,091,665 | 5/1978 | Fletcher et al. | 73/147 |
| 4,111,058 | 9/1978 | Gross | 73/714 |
| 4,142,410 | 3/1979 | Pedgonay | 73/147 |

Primary Examiner—Donald O. Woodiel
Attorney, Agent, or Firm—John Swiatocha

[57] ABSTRACT

The accuracy of performance data obtained from instrumentation associated with a wind tunnel test facility is determined by a comparison of empirically and analytically determined performance data associated with a combustorless gas turbine engine reference model. The reference model includes a housing (30) terminating in an exhaust nozzle (85) of standard geometry for which empirical performance data exists. A plurality of apertured plates (130–145) spaced from each other and other reference model components by spacer rings (165–185) adjust airflow through the reference model to correspond to that encountered in the actual wind tunnel testing of a combustorless gas turbine engine simulator.

12 Claims, 1 Drawing Figure

U.S. Patent  Aug. 13, 1985  4,534,216
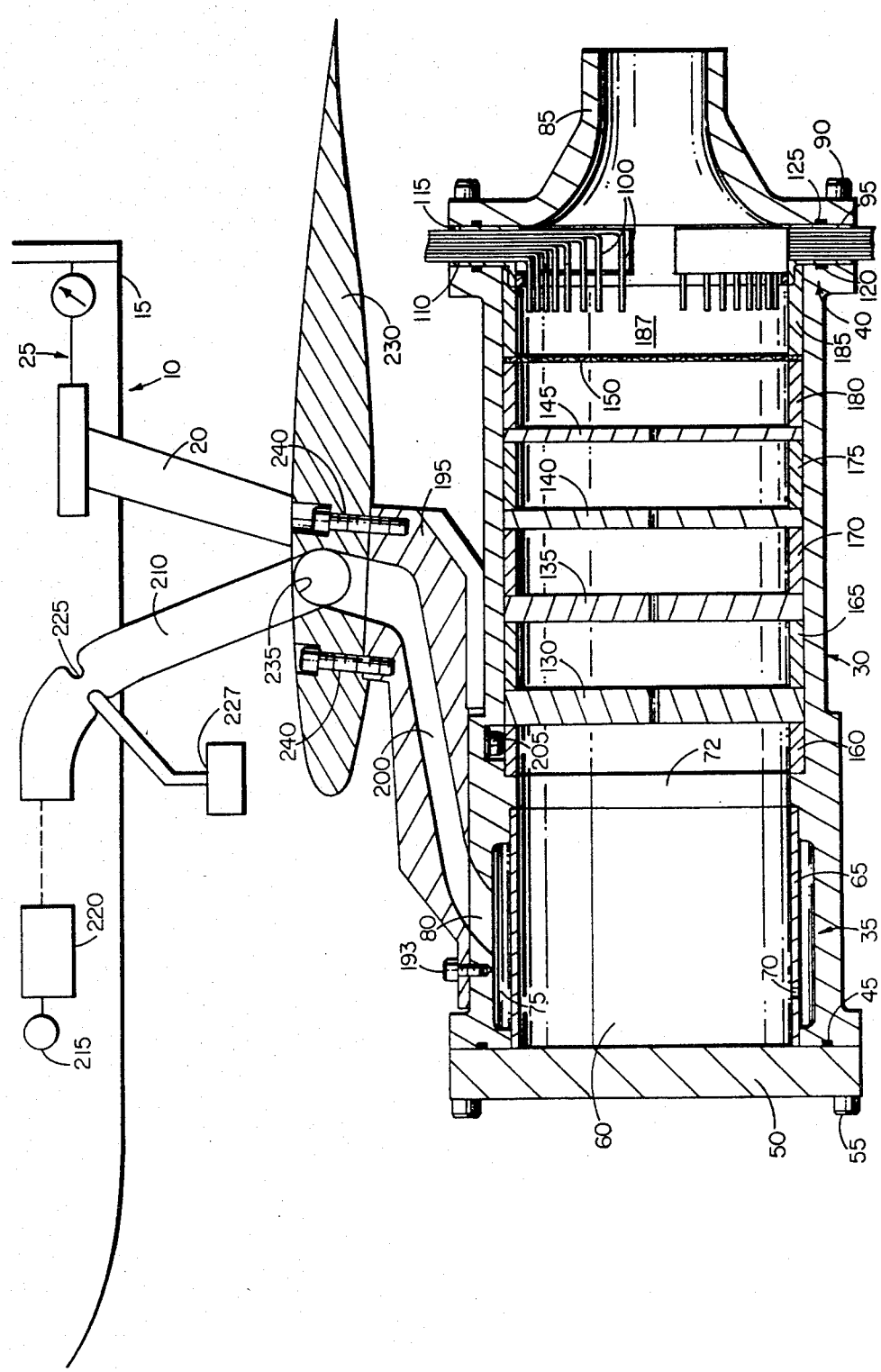

METHOD AND APPARATUS FOR DETERMINING THE ACCURACY OF WIND TUNNEL TEST DATA

TECHNICAL FIELD

This invention relates generally to the wind tunnel testing of aeronautical models and more specifically to a method and apparatus for evaluating or verifying the accuracy of data obtained in such testing.

BACKGROUND ART

The design and development of modern commercial and military aircraft usually involves modeling the aircraft under development and determining the performance of the model within a wind tunnel. Typically, the performance of the model is determined by measuring the aerodynamic forces such as lift imparted to the model by an airstream established and maintained by the wind tunnel. In those cases where the model is provided with a "powered nacelle" (a nacelle which houses an air powered, combustorless gas turbine engine simulator), the thrust of the airstream exhausted from the engine model may be utilized in determining that performance parameter known in the art as "net thrust-minus-drag".

Such measurements of lift, and thrust-minus-drag are typically made on force balances, forces on the model being transmitted to the balance by, for example, the structure supporting the model within the wind tunnel. Such performance measurements generally require measurements of airflow as well, such airflow measurements being made with flowmeters, pressure measuring instrumentation, or analogous equipment. It is generally accepted by those skilled in the art that such balances and flow measuring instrumentation have various inherent inaccuracies associated therewith which are manifested as both data bias and scatter. Moreover, such inaccuracies vary from one wind tunnel facility to another whereby testing the same model in different wind tunnel facilities will usually yield disparities in measured performance data. It will be readily apparent that such inaccuracies (as those inherent in the instrumentation per se and those associated with the connection of the model to the wind tunnel) not only have a generally deleterious effect on the overall accuracy of measured data but render meaningful conclusions as to the effects of adjustments in model geometries on model performance, difficult if not impossible to draw.

The above-noted inaccuracies associated with wind tunnel facility instrumentation depend in large measure, on both the magnitude of the airflow through the wind tunnel as the model is tested and the magnitude of the airflow which powers the cumbustorless gas turbine engine simulator. Therefore, since aircraft models are typically tested over a substantial range of flows through both the wind tunnel and the gas turbine engine simulator, it is necessary for obtaining accurate performance data that the inaccuracies associated with the wind tunnel testing be determinable for the particular airflows at which the model is being tested.

Accordingly, among the objects of the present invention is the provision of a method and apparatus for determining the inaccuracies (data bias and scatter) associated with wind tunnel testing of aeronautical models with powered nacelles at prescribed airflow conditions.

DISCLOSURE OF INVENTION

In accordance with the present invention, inaccuracies (data bias and scatter) associated with the wind tunnel testing of an aeronautical model are determined by providing a reference model of the cumbustorless gas turbine engine simulator employed in the aeronautical model, the reference model including an exhaust nozzle of standard geometry and thus empirically known performance, and exposing such a reference model to the airflow conditions at which the aeronautical model is tested. By measuring the flow conditions through the reference model, the performance of the reference model at those conditions is determined by empirical methods and is compared with the performance of the reference model as determined in part by measurements made by the force and airflow measuring instrumentation of the wind tunnel facility. The comparison between the empirically determined performance of the reference model and the measured performance of the reference model at similar flow conditions, enables the data bias and scatter associated with the wind tunnel facility's instrumentation to be readily determined. Knowing the magnitude of such data bias and scatter enables the performance of the aeronautical model to be measured with enhanced accuracy.

In the preferred embodiment, the reference model comprises a housing having means therein to maintain the pressure and flow rate of airflow therethrough at levels corresponding to those of the airflow through the air-powered combustorless gas turbine engine simulator of the aeronautical model undergoing test. The housing terminates in the standard exhaust nozzle noted hereinabove such as a standard ASME convergent nozzle. The reference model is instrumented at various locations thereon for measurements of flow conditions therethrough.

BRIEF DESCRIPTION OF DRAWING

The sole figure is a partially sectioned side elevation of the apparatus of the present invention schematically shown in a wind tunnel test facility.

BEST MODE FOR CARRYING OUT THE INVENTION AND INDUSTRIAL APPLICABILITY THEREOF

Referring to the drawing, a wind tunnel test facility is generally shown in schematic form at 10, the facility comprising the wind tunnel 15, supporting structure 20 on which aeronautical models may be mounted for testing within the tunnel and a force balance 25 by which forces such as lift, and thrust-minus-drag on such aeronautical models may be measured for determination of the performance of the model. The aeronautical model (not shown) undergoing test is supported on the lower end of structure 20 within the airflow through the wind tunnel.

As set forth hereinabove, models so tested in wind tunnel facilities may include one or more air powered, combustorless gas turbine engine simulators disposed within scale model nacelles. An example of such a gas turbine engine simulator is described in U.S. Pat. No. 3,434,679 to Kutney et al. Those skilled in the art will appreciate that the measured performance of the aeronautical model undergoing test will in large measure depend upon the performance (thrust output) of the air powered engine simulator. However, as set forth hereinabove, data bias and scatter associated with the wind tunnel's force and airflow measuring instrumentation necessarily limits the accuracy at which such performance can be measured. By the present invention, with the provision of a reference model, the performance of which can be accurately determined based upon the characteristics of flow therethrough and geometry thereof, the data bias and scatter associated with the force balance and a flowmeter noted hereinafter can be determined and therefore factored out of any performance measurements of the aeronautical model undergoing test.

Such a reference model is shown in detail in the drawing, the model comprising a generally annular housing 30 formed from steel or other suitable material including upstream and downstream end portions 35 and 40, upstream end portion 35 being sealed by O-ring seal 45 to flat plate cap 50 which is fastened to the housing by screws 55. Upstream housing end 35 defines an inlet plenum 60 surrounded by a sleeve 65 apertured at 70. Plenum 60 is bounded at the downstream end thereof by an annular shoulder 72 and lends a directional uniformity to the airflow entering the reference model. The outer surface of sleeve 65 defines with the housing wall, an annular inlet chamber 75 communicating with air inlet 80 through the wall of the housing.

The downstream end of housing 30 has a standard convergent flow (exhaust) nozzle 85 attached thereto by screws 90 which also serve to clamp pressure rake assembly 95 between the nozzle and the housing. Pressure rake assembly 95 comprises one or more pressure tubes 100 secured to an annular adapter 105 by any suitable means, adapter 105 including an outlet portion 110, the end of the rake extending through the outlet portion and connecting to monometers or any other suitable pressure measuring instruments (not shown). Adapter 105 is sealed to the downstream end of housing 30 and nozzle 85 by O-ring seals 120 and 125.

A plurality of apertured plates or bulkheads 130-145 and a screen 150 are serially disposed upstream of nozzle 85 and spaced from one another, from shoulder 72 and from rake adapter 105 by a plurality of spacer rings 160-185. Screen 150, and the downstream portion of housing 30 define a plenum 187 immediately upstream from nozzle 85 which, with screen 190 imparts a directional uniformity to the flow entering the nozzle.

Housing 30 is mounted by screws 193 to a strut 195 provided interiorly thereof with conduit 200 communicating with inlet 80. Conduit 200 also communicates with tube or conduit 210 provided with highly pressurized (on the order of 1,000 psi) air from pump 215 and charging tank 220. Conduit 210 may be provided with a restriction or orifice 225 at which airflow through the reference model may be measured by flowmeter 227. Strut 195 may be mounted to an aeronautical model airfoil 230, the airfoil including a flow passage 235 therein which provides communication between conduits 200 and 210.

In the testing of the aeronautical model, pump 215 pressurizes air to the extent necessary for the desired operation of the combustorless gas turbine engine simulator. The pressurized air is stored in charging tank 220 for delivery to the engine model through conduit 210 and passage 235 in airfoil 230.

In order to determine the data bias and scatter associated with the wind tunnel facility instrumentation such as flowmeter 227 and force balance 25, the reference model described and illustrated herein is substituted for the gas turbine engine model, being secured in place thereof on airfoil 230 by screws 240. Accordingly, the reference model, like the gas turbine engine model is pressurized by pump 215 through charging tank 220, conduit 210 and conduit 235 in the airfoil. From conduit 235, the pressurized air flows through conduit 200 in strut 195, through inlet 80 and aperture 70 into inlet plenum 60. From inlet plenum 60, the air flows interiorly of annular shoulder 72, through the apertures in plates 130-145, through screen 150 and plenum 187, past pressure rake 100 and finally, through convergent exhaust nozzle 85. Housing 30 is sized and plates 130-150 are quantified, sized and apertured so as to essentially duplicate the pressure drop and flow rate of the airflow through the gas turbine engine simulator at similar supply airflow conditions. Knowing the characteristics of the supply airflow and the airflow through the reference model, as well as the geometry of exhaust nozzle 85, the nozzle performance is readily determined from available empirical data. Nozzle performance is also analytically determinable, in part, by data measurements made on force balance 25 and flowmeter 227, a comparison of the empirical performance data with the analytically determined performance data indicating the data bias and scatter (inaccuracies) inherent in the arrangement.

By way of example, the discharge coefficient for the reference model of the drawing may be determined as follows:

$$C_{DF} = \frac{\dot{W}_{ACTUAL}}{\dot{W}_{IDEAL}} = \frac{\dot{W}_{ACTUAL}}{\overline{M}_N P_{TN} A_N / \sqrt{T_{TN}}}$$

wherein:
$W_{ACTUAL}$ is the actual weight flow of air through the reference model as measured by flowmeter 227;
$W_{IDEAL}$ is the ideal (maximum) air weight flow through nozzle 85;
$P_{TN}$ is the total pressure at the nozzle inlet determined as the average of the pressures measured by rake 100;
$A_N$ is the cross-sectional area of the exit of exhaust nozzle 85;
$T_{TN}$ is the average temperature of the air at the inlet to nozzle 85; and
$\overline{M}_N$ is the following function (most often in tabulated form) of $P_{TN}$ and ambient pressure ($P_A$) surrounding exhaust nozzle 85:

$$\overline{M}_N = \frac{P_A}{P_{TN}} [.9189 \, M_N (1 + 0.2 \, M_N^2)^{\frac{1}{2}}]$$

wherein:

$$P_A \geq 0.528 \, P_{TN}; \text{ and}$$

$$M_N = \sqrt{5\left[\left(\frac{P_{TN}}{P_A}\right)^{0.2857} - 1\right]}$$

Similarly, the thrust coefficient for nozzle 85 is calculated as follows:

$$C_T = \frac{T_{MEAS}}{F_{IDEAL}} = \frac{T_{MEAS}}{\frac{W_{ACTUAL}}{g} M_{IDEAL} \sqrt{\gamma R T_{SN}}}$$

wherein:

$T_{MEAS}$ is the thrust output at the outlet of nozzle 85 as measured by the wind tunnel force balance 25;

$F_{IDEAL}$ is the ideal (maximum) thrust provided by nozzle 85;

$W_{ACTUAL}$ is the actual weight flow of air through the reference model as measured by flow meter 227;

g is gravitational acceleration;

$M_{IDEAL}$ is the Mach Number corresponding to the total pressure at the inlet of nozzle 85 and the ambient pressure surrounding the nozzle;

R is the universal gas constant $-1716.322$;

$T_{SN}$ is the static temperature at the exit of nozzle 85 as determined from the nozzle exit temperature and the nozzle exit Mach Number; and $\gamma$ is the specific heat ratio for air $-1.4$.

Having thus calculated the discharge and thrust coefficients for the reference model based on measurements by the wind tunnel flowmeter 227 and force balance 25, this data may be compared with empirical data in the literature for such an ASME nozzle as is employed in the reference model.

It is thus seen that the calculated discharge and thrust coefficients are based on the values of such parameters as thrust and airflow as measured by the force balance and flowmeter, respectively, and various flow parameters such as pressures and temperatures as well as geometries such as nozzle area. It will be appreciated that such flow parameters as pressures and geometries are accurately determinable by known measuring techniques. However, as set forth hereinabove, force and airflow measurements made with the balance and flowmeter are generally not as reliable as data such as pressure temperature and geometric data. Thus, if the coefficients calculated in the manner described hereinabove do not closely correspond to the empirical data, the inconsistencies will generally be due to inaccuracies in the force balance and flowmeter. The magnitude of any discrepancy between the empirically determined and measured coefficients can, by means of the algorithms set forth hereinabove, be quantitatively established. If the discharge and thrust coefficients obtained from the reference model closely correspond to those obtained from the empirical data, the data obtained from the force balance and flowmeter will be understood to be generally reliable and, therefore, characterized by minimal inaccuracies (bias and scatter).

It will be appreciated by those skilled in the art that the reference model of the present invention employed as described herein provides a convenient means for determining both the existance and magnitude of the inaccuracies or data bias and scatter associated with the force balance and flowmeter of a wind tunnel test facility. The model may be instrumented by any various means known in the art to obtain the flow parametric data set forth hereinabove. The provision of the exhaust nozzle of standard geometry allows the performance thereof, and hence the accuracy of data obtained from the force balance to be readily checked by existing empirical data. The reference model allows the checking of the balance and flowmeter accuracy to be done at the flow conditions actually encountered in the testing of the airframe model and engine simulator.

While a particular embodiment of the combustorless gas turbine engine reference model has been shown, it will be appreciated that the disclosure herein will itself suggest certain modifications to those skilled in the art. For example, while an ASME-type nozzle is shown, any of various other standardized nozzles for which empirical performance data exists, may be employed. Similarly, while a generally simple cylindrical housing has been employed, where it is desired to utilize the reference model under conditions of flow through the tunnel, the housing may be aerodynamically shaped to approximate the conditions encountered by the actual airframe and gas turbine engine simulator. Similarly, while a specific number of apertured plates and spacing rings has been shown, various other arrangements will suggest themselves to those skilled in the art on the basis of the flow conditions within the combustorless simulator which are sought to be duplicated. Accordingly, it is intended by the following claims, to cover these and other such modifications which will suggest themselves to those skilled in the art.

Having thus described the invention what is claimed is:

1. A reference model for the wind tunnel testing of a combustorless gas turbine engine simulator, said reference model being characterized by:
   a housing having upstream and downstream end portions, said housing being adapted for the accommodation therethrough of a flow of pressurized air;
   means disposed interiorly of said housing for maintaining the pressure and flow rate of said airflow at levels corresponding to those associated with the operation of said combustorless gas turbine engine simulator in the aerodynamic testing thereof; and
   an exhaust nozzle of standard geometry disposed at the downstream end portion of said housing;
   whereby the accuracy of performance measurements associated with said aerodynamic testing of said combustorless gas turbine engine model is determinable by a comparison of the performance of said reference model determined analytically, with the performance of said reference model determined empirically from the characteristics of said airflow through said reference model and the geometry of said exhaust nozzle.

2. The reference model of claim 1 characterized by said pressure and flow rate maintenance means comprising at least one apertured plate accommodating said airflow therethrough.

3. The reference model of claim 2 characterized by said pressure and flow rate maintenance means comprising a plurality of apertured plates disposed serially in the direction of said airflow.

4. The reference model of claim 1 characterized by said supply air being admitted to said reference model through an inlet disposed in said upstream end portion of said housing, said inlet communicating with an inlet plenum disposed upstream from said pressure and flow rate maintenance means for maintaining the directional uniformity of airflow through said housing.

5. The reference model of claim 1 characterized by means disposed between said nozzle and said pressure and flow rate maintenance for straightening said airflow prior to the entrance of said airflow into said nozzle.

6. The reference model of claim 5 characterized by said airflow straightening means comprising a screen.

7. The reference model of claim 1 characterized by an exhaust plenum disposed between said pressure and flow rate maintenance means and said exhaust nozzle for maintaining the directional uniformity of airflow therethrough.

8. The reference model of claim 1 characterized by said exhaust nozzle being an ASME-type nozzle.

9. A method of aerodynamically testing an aeronautical model by subjecting said aeronautical model to a flow of fluid and measuring the aerodynamic performance of said aeronautical model, said method being characterized by:

providing a reference model of empirically determinable aerodynamic performance characteristics which aerodynamically approximates the aeronautical model being tested;

subjecting said reference model to said flow of fluid;

determining the aerodynamic performance of said reference model at least in part by measurement of the aerodynamic forces thereon;

comparing said measured aerodynamic performance with said empirically determinable aerodynamic performance characteristics, any disparity between said empirically known performance characteristics and said measured aerodynamic performance being indicative of inaccuracies inherent in said measurements of the performance of said aeronautical model.

10. The method of claim 9 characterized by said aeronautical model being a combustorless gas turbine engine simulator powered by a flow of gas therethrough.

11. The method of claim 10 characterized by said reference model comprising:

a housing having upstream and downstream end portions, said housing being adapted for accommodation therethrough of a pressurized flow of said gas;

means disposed interiorly of said housing for maintaining the pressure and flow rate of said gas at levels corresponding to those associated with said gas turbine engine simulator; and an exhaust nozzle of standard geometry disposed at the downstream end portion of said housing;

said measured and empirically determinable aerodynamic performance of said reference model comprising at least one of the thrust and discharge coefficients associated with the exhaust nozzle thereof.

12. The method of claim 11 characterized by said pressure and flow rate maintenance means comprising at least one apertured plate which accommodates said gas flow therethrough.

* * * * *